United States Patent
Tian et al.

(10) Patent No.: US 11,643,350 B2
(45) Date of Patent: May 9, 2023

(54) METHOD FOR REDUCING HEAVY METAL CONTENT OF SLUDGE-BASED BIOCOKE

(71) Applicant: Zhejiang Zone-King Environmental Sci&Tech Co., Ltd, Hangzhou (CN)

(72) Inventors: Ping Tian, Hangzhou (CN); Yufeng Wang, Hangzhou (CN); Weilong Zhuo, Hangzhou (CN); Hui Li, Hangzhou (CN)

(73) Assignee: Zhejiang Zone-King Environmental Sci&Tech Co., Ltd, Hangzhou (CN)

( * ) Notice: Subject to any disclaimer, the term of this patent is extended or adjusted under 35 U.S.C. 154(b) by 114 days.

(21) Appl. No.: 17/302,839

(22) Filed: May 13, 2021

(65) Prior Publication Data
US 2022/0169547 A1 Jun. 2, 2022

(30) Foreign Application Priority Data
Dec. 1, 2020 (CN) .......................... 202011378248.3

(51) Int. Cl.
| | |
|---|---|
| *C02F 9/00* | (2023.01) |
| *C02F 11/02* | (2006.01) |
| *C02F 11/10* | (2006.01) |
| *C02F 11/122* | (2019.01) |
| *C05F 5/00* | (2006.01) |
| *C02F 11/13* | (2019.01) |
| *C02F 101/20* | (2006.01) |
| *C02F 11/00* | (2006.01) |

(52) U.S. Cl.
CPC ............... *C02F 9/00* (2013.01); *C05F 5/004* (2013.01); *C02F 11/004* (2013.01); *C02F 11/02* (2013.01); *C02F 11/10* (2013.01); *C02F 11/122* (2013.01); *C02F 11/13* (2019.01); *C02F 2101/20* (2013.01); *C02F 2305/06* (2013.01)

(58) Field of Classification Search
CPC ......... C02F 2/00; C02F 11/004; C02F 11/02; C02F 11/10; C02F 11/122; C02F 11/13; C02F 2101/20
See application file for complete search history.

(56) References Cited

FOREIGN PATENT DOCUMENTS

| | | | |
|---|---|---|---|
| CN | 103739177 A | 4/2014 | |
| CN | 104258808 A | 1/2015 | |
| CN | 108503181 * | 9/2018 | ............. C02F 11/12 |
| CN | 110217971 A | 9/2019 | |
| CN | 110342775 A | 10/2019 | |

OTHER PUBLICATIONS

English machine translation of CN 108503181 (Year: 2018).*

* cited by examiner

*Primary Examiner* — Renee Robinson
(74) *Attorney, Agent, or Firm* — Schwegman Lundberg & Woessner, P.A.

(57) ABSTRACT

The disclosure relates to a treatment method for sludge utilization in a sewage treatment plant, in particular to a method for reducing heavy metal content of sludge-based biocoke. The disclosure includes following steps (1) to (5): step (1): concentrating a residual sludge produced by a municipal sewage treatment plant to be with a moisture content of 95-98%; step (2): conditioning the concentrated sludge in a sludge bioleaching tank for 48 hours, with a pH value of the sludge being reduced to below 4.5; step (3): pumping the conditioned sludge into a high-pressure diaphragm plate and frame for a press filter dewatering to obtain a dewatered cake with a moisture content less than or equal to 50%; step (4): delivering the dewatered cake into a sludge dryer for crushing, heating and drying to obtain the dried sludge with a moisture content of 15-22%; and step (5): carbonizing the dried sludge into sludge-based biocoke at a high temperature in a pyrolytic carbonization device with a carbonization temperature of 500-650° C.

6 Claims, No Drawings

METHOD FOR REDUCING HEAVY METAL CONTENT OF SLUDGE-BASED BIOCOKE

CROSS-REFERENCE TO RELATED APPLICATIONS

This Non-provisional application claims priority under 35 U.S.C. § 119(a) to Chinese Patent Application No. 202011378248.3 filed on Dec. 1, 2020, the entire contents of which are hereby incorporated by reference in their entirety.

TECHNICAL FIELD

The disclosure relates to a treatment method for sludge utilization in a sewage treatment plant, in particular to a method for reducing heavy metal content of sludge-based biocoke.

BACKGROUND ART

Solid substances separated or trapped during wastewater treatment in sewage treatment plants are collectively referred to as sludges, which can be classified to be a primary sludge, a residual sludge and a chemical sludge according to different processes. The sludge is in a complex composition, which includes a *zoogloea* formed by various microorganisms, organic matters adsorbed therewith and the like, which are easy to rot, emit odor and toxic gases, and contain pathogenic substances such as germs, viruses and parasite eggs, and harmful and refractory substances such as heavy metals like mercury, chromium, lead and copper, dioxins and radionuclides; and if the sludge is treated or disposed in an improper way, potential risks may be brought to human health and the environment, resulting in a large number of secondary pollutions which turn out to be new pollution sources.

As of June 2019, more than 5,000 urban sewage treatment plants (excluding township sewage treatment plants and industries) had been built in cities across the country, with a sewage treatment capacity of 210 million cubic meters per day; and it is predicted from the data that a sludge production in China would exceed 70 million tons in 2020 (with a moisture content of 80%). The long-standing phenomenon of 'heavy water mud light' in China has not yet been fundamentally changed, and a main reason for this is that the sludge has not been subject to reduction, innocuous and stabilization treatments, which leads to many restrictions on an ultimate resource utilization and disposal of the sludge.

The sludge-based biocoke refers to products produced by heating and carbonizing sludges from the sewage treatment plant at high temperature. In a production process of the sludge-based biocoke, its volume is greatly reduced, viruses, parasites and toxic pollutants and the like in the sludge can be completely removed, and the reduction, innocuous and stabilization treatments of the sludge can be efficiently realized; moreover, the sludge-based biocoke has characteristics such as a large specific surface area, a rich porous structure and a wide resource utilization. For example, the sludge-based biocoke is often used as a soil modifier or soil fertilizer, which can solve problems of soil hardening and ventilation, improve soil fertility and water retention capacity, and reduce toxicity of the heavy metals in soil.

The heavy metal in the sludge is one of key factors restricting a large-scale land utilization and other resource utilization methods of the sludge. When the sludge-based biocoke is used as a soil modifier, the pollutants such as heavy metals contained in the sludge-based biocoke can be absorbed into a food chain by plants, which presents certain potential risks; and therefore, the country requires a strict control of an agricultural use of the sludge, and has issued "Control Standards for Agricultural Sludge Pollutants" GB4284-2018. However, there is a lack of safety risk assessment in land use of the sludge-based biocoke, and its national standard has not yet been issued; and due to a potential secondary pollution caused by the sludge-based biocoke, the resource utilization of the sludge-based biocoke has not been widely promoted.

Currently, there have been related reports on research technologies of the sludge-based biocoke, most of which are about pyrolysis and carbonization processes of the sludge-based biocoke, but researches on how to reduce a concentration of the heavy metals contained in the sludge-based biocoke itself lacks attention. An environment-friendly processing system of a sludge biocoke and an environment-friendly rotary sludge dryer thereof are disclosed in Chinese patent application CN201822224982.9, in which a concentrated sludge with a moisture content of 95-96% is dewatered at a high pressure to obtain a dewatered sludge with a moisture content of 48-52%; a certain amount of humic acid is added and a biaxial forced sludge mixer is used for mixing and drying to obtain a semi-dried mixed sludge with a moisture content of 23-38%; then the semi-dried mixed sludge with the moisture content of 23-38% is heated and dried using an environment-friendly rotary sludge dryer; and a dried sludge with a moisture content of 7-10% is heated and carbonized using an environment-friendly rotary sludge carbonizer after being crushed.

A heat supply control system of a drying furnace for sludge drying and carbonizing is disclosed in Chinese patent application CN201910750844.0, which includes a treatment system and a heat supply system which are arranged in layers from top to bottom, the treatment system including a drying furnace 1, a drying furnace 2 and a carbonizing furnace, and the heat supply system including a secondary combustion chamber and a biomass burner.

A method and a system for improving a specific surface area of a sludge biocoke are disclosed in CN201410442329.3, which includes steps of: stirring, mixing and heating a dried sludge and broken polystyrene waste plastics in proportion, so that the polystyrene waste plastics are melted and shrunk in the sludge and relatively uniformly attached to surfaces of sludge particles, which are then directly press-molded; and sending the press-molded sludge particles to a pyrolysis carbonization system for a carbonization treatment, so that sludge pyrolytic biocoke with a good pore structure can be obtained.

A preparation method of sludge-based biocoke is disclosed in Chinese patent application CN201910457124.5, which relates to a technical field of sludge-based biocoke preparation. This disclosure includes following steps: sequentially concentrating, modifying, and high-dry dewatering a municipal sludge to form a dewatered cake; and crushing, drying, pyrolyzing and carbonizing the dewatered cake to obtain the sludge-based biocoke; during this, an agent added in modifying is one or more of an inorganic coagulant, an organic coagulant and an additive, and the inorganic coagulant is at least one of aluminum sulfate, aluminum potassium sulfate, sodium aluminate, ferrous sulfate, ferric sulfate, polymeric ferric sulfate, polymeric aluminum sulfate and polyferrosilion and the additive is at least one of fly ash, plant ash, sawdust and rice husk. The above patents are all about preparation methods and devices of the sludge-based biocoke, and in the production process of the sludge-based biocoke, external substances are mainly mixed with the sludge, so as to improve formation of the biocoke and improve its quality, but none of the above patents involves related reports on how to reduce the concentration of the heavy metals contained in the sludge-based biocoke.

The sludge-based biocoke which meets quality requirements can be obtained by preparation through different carbonization equipment and carbonization processes. However, the sludge in sewage treatment plants is in a complex composition, and there is no uniform method and standard for the preparation of the sludge-based biocoke; moreover, the carbonization of the sludge with excessive heavy metals is a solidification and enrichment process of the heavy metals, which leads to excessive heavy metals in the sludge-based biocoke in itself and limited land use methods. Therefore, it is of great importance for realization of stabilization, innocuous and reduction treatments of the sludge and thus finally of the resource utilization of the sludge to develop a safe way for the sludge-based biocoke preparation in sewage treatment plants.

SUMMARY

In view of difficulties for resource utilization of existing sludge-based biocoke due to an excessive heavy metal content therein, the disclosure provides a resource treatment method for a sludge in a sewage treatment plant, which can be widely applied to a preparation of sewage treatment plant sludge-based biocoke and reduces the heavy metal content in the sludge-based biocoke.

A technical solution used in the disclosure to solve the above problems is: the method for reducing the heavy metal content of the sludge-based biocoke is characterized by including following steps (1) to (5):

step (1): concentrating a residual sludge produced by a sewage treatment plant to be with a moisture content of 95-98%;

step (2): conditioning the concentrated sludge in a sludge bioleaching tank for 48 hours, with a pH value of the sludge being reduced to below 4.5;

step (3): pumping the conditioned sludge into a high-pressure diaphragm plate and frame for a press filter dewatering to obtain a dewatered cake with a moisture content less than or equal to 50%;

step (4): delivering the dewatered cake into a sludge dryer for crushing, heating and drying to obtain the dried sludge with a moisture content of 15-22%; and step (5): carbonizing the dried sludge into sludge-based biocoke at a high temperature in a pyrolytic carbonization device with a carbonization temperature of 500-650° C.

Further, in the step (1), only a gravity concentration in a concentration tank is applied without adding flocculants such as PAM, and after the sludge concentration, a dregwater separation is made with a supernatant being discharged to a front influent end of sewage treatment, and the concentrated sludge is pumped to a sludge conditioning unit by a lift pump.

Further, the step (2) is realized by the sludge conditioning unit using a sludge bioleaching conditioning process, which includes sludge acclimation, sludge inoculation and sludge cultivation steps, with a conditioning time of 36 to 48 hours.

Further, in the sludge bioleaching conditioning process for the incoming concentrated sludge, a special leaching microbial nutrient, mainly composed of iron disulfide, glucose, reduced iron and dressing and the like, can be added in an amount of 5-15% of the absolute dry sludge.

Further, after the sludge is conditioned by bioleaching, on the one hand, dewatering performance of the sludge can be improved and a specific resistance of the sludge can be reduced; and on the other hand, a leaching system is in a weak acid state, which can change an influence of heavy metal accumulation in the sludge and transfer the heavy metals in the sludge into a liquid phase, thereby reducing a content of the heavy metals adsorbed in the sludge.

Further, in the step (3), the conditioned concentrated sludge is pumped into the high-pressure diaphragm plate and frame with a high-pressure feed pump for the press filter dewatering with a pressure of 1.6-2.0 Mpa, and after a pressure chamber is filled up with the sludge, a press pump is switched for a secondary press dewatering with a pressure of 6.0-7.0 Mpa, and the moisture content of the dewatered sludge can be directly reduced to below 50% after the secondary high-pressure press dewatering.

Further, in the step (4), the sludge is dried by an energy-saving dryer, and the sludge is crushed to 5-10 mm by a grinder before entering the dryer, which is beneficial to heat absorbing and quick drying of the sludge; and the sludge is uniformly dispersed in the dryer cavity through a belt conveyor, and heated exhaust gases are collected, and waste heat is returned to the dryer for continuous utilization after a condensation and heat exchange.

Further, in the step (4), a pyrolysis carbonization temperature of the dried sludge is 500-650° C., the temperature is kept constant during carbonization, and a carbonization chamber can be in an oxygen-free or anoxic state.

Compared with the prior art, the disclosure has following advantages:

1. Effective reduction of malodorous gases. When the sludge is in the anoxic state, it is easy to produce waste gases; and in a conventional sludge carbonization process, the sludge is mostly without oxygen supply from the concentration, drying to carbonization processes, and the odor on site is serious. The sludge bioleaching process used in the disclosure is an aerobic process, and reducing malodorous substances such as hydrogen sulfide are completely decomposed under aerobic conditions, so that the sludge odor can be remarkably improved; and after the sludge is dewatered under an ultrahigh pressure, the moisture content of the sludge is reduced, and further odor generation of the sludge can be improved.

2. Good practicability in industrial applications. Currently, the treatment and preparation process of the sludge-based biocoke is still limited to a stage of small and medium-sized pilot scientific research and development, with a poor popularization. The sludge bioleaching deep dewatering process used in the disclosure has been implemented in engineering cases, and projects runs stably with good feedback.

3. The sludge dewatering efficiency is high. According to the disclosure, after the sludge is subjected to the bioleaching conditioning and the press filter dewatering with the plate and frame at an ultra-high pressure, the moisture content of the sludge is directly reduced to below 50%, with a dewatering efficiency 350% higher than a conventional one for which the dewatering is made to 80%, thus saving a large amount of energy consumption output for the back-end sludge drying process and reducing overall equipment investment and operation cost.

4. The sludge has a high carbon content and high carbonization quality. In the sludge-based biocoke preparation process in this disclosure, inorganic substances such as calcium oxide and the like are not added in the sludge bioleaching process, a sludge dry matter mass is not increased, a heat value of the sludge is completely preserved; and no additional substances are needed in the sludge carbonization process so as to increase the carbon content and the carbonization quality is good.

5. High economic benefit. The sludge treatment and disposal process of the disclosure requires less investment in drying equipment and low overall processing cost, and the generated sludge-based biocoke provides large sales profit, which can generate benefits for the sewage treatment plant itself and also has certain external investment value.

6. Resource utilization is not restricted. The heavy metals in the sludge-based biocoke in the disclosure can be completely detoxified, and in the process of bioleaching and carbonization, the hygienic indexes are all meet the standard, and the sludge-based biocoke is particularly suitable for resource utilizations such as agricultural use of the sludge.

DETAILED DESCRIPTION

In the following, the present disclosure will be further described in detail by way of embodiments which present explanation of the present disclosure and the present disclosure is not limited to the following embodiments.

EMBODIMENTS

It should be noted that terms such as "upper", "lower", "left", "right", "middle" and "an" referenced in this specification are only for convenience of description and clarity, but not intended to limit the implementable scope of the present disclosure; and the change or adjustment to its relative relation shall be regarded as within the implementable scope of the present disclosure without any substantial change to the technical content.

The method for reducing heavy metal content of sludge-based biocoke in this embodiment includes following steps (1) to (5):

step (1): concentrating a residual sludge produced by a sewage treatment plant to be with a moisture content of 95-98%;

step (2): conditioning the concentrated sludge in a sludge bioleaching tank for 48 hours, with a pH value of the sludge being reduced to below 4.5;

step (3): pumping the conditioned sludge into a high-pressure diaphragm plate and frame for a press filter dewatering to obtain a dewatered cake with a moisture content less than or equal to 50%;

step (4): delivering the dewatered cake into a sludge dryer for crushing, heating and drying to obtain the dried sludge with a moisture content of 15-22%; and step (5): carbonizing the dried sludge into sludge-based biocoke at a high temperature in a pyrolytic carbonization device with a carbonization temperature of 500-650.

In the step (1) in this embodiment, only a gravity concentration in a concentration tank is applied without adding flocculants such as PAM, and after the sludge concentration, a dreg-water separation is made with a supernatant being discharged to a front influent end of the sewage treatment, and the concentrated sludge is pumped to a sludge conditioning unit by a lift pump.

The step (2) in this embodiment is realized by the sludge conditioning unit using a sludge bioleaching conditioning process, which includes sludge acclimation, sludge inoculation and sludge cultivation steps, with a conditioning time of 36 to 48 hours.

In the sludge bioleaching conditioning process for the incoming concentrated sludge in this embodiment, a special leaching microbial nutrient, mainly composed of iron disulfide, glucose, reduced iron and dressing and the like, can be added in an amount of 5-15% of the absolute dry sludge.

After the sludge is conditioned by bioleaching in this embodiment, on the one hand, dewatering performance of the sludge can be improved and a specific resistance of the sludge can be reduced; and on the other hand, the leaching system is in a weak acid state, which can change an influence of heavy metal accumulation in the sludge and transfer the heavy metals in the sludge into a liquid phase, thereby reducing a content of the heavy metals adsorbed in the sludge.

In the step (3) of this embodiment, the conditioned concentrated sludge is pumped into the high-pressure diaphragm plate and frame with a high-pressure feed pump for the press filter dewatering with a pressure of the pump of 1.6-2.0 Mpa, and after a pressure chamber is filled up with the sludge, a press pump is switched for a secondary press dewatering with a pressure of 6.0-7.0 Mpa, and the moisture content of the dewatered sludge can be directly reduced to below 50% after the secondary high-pressure press dewatering.

In the step (4) of this embodiment, the sludge is dried by an energy-saving dryer, and the sludge is crushed to 5-10 mm by a grinder before entering the dryer, which is beneficial to heat absorbing and quick drying of the sludge; and the sludge is uniformly dispersed in the dryer cavity through a belt conveyor, and heated exhaust gases are collected and waste heat is returned to the dryer for continuous utilization after a condensation and heat exchange.

In the step (4) of this embodiment, a pyrolysis carbonization temperature of the dried sludge is 500-650, the temperature is kept constant during carbonization, and a carbonization chamber can be in an oxygen-free or anoxic state.

The following cases are realized by using this method for reducing the heavy metal content of the sludge-based biocoke.

Case 1.

Details of residual sludge from a municipal sewage treatment plant are shown in a table below.

| Sludge Type | Municipal Sludge |
|---|---|
| Sampling Point | Outlet of Belt Filter Press |
| Moisture Content | 80.37% |
| Organic Matters | 42.39% |

The sludge of the sewage treatment plant is concentrated by a radial continuous gravity concentration, and the residual sludge of the secondary sedimentation tank is discharged into the concentration tank, and the sludge is gravity concentrated to a moisture content of about 95% without adding the concentration agent. After the sludge concentration, a dreg-water separation is made with a supernatant being discharged to the front influent end of the sewage treatment, and the concentrated sludge is pumped to the sludge conditioning unit by the lift pump.

A bioleaching conditioning process is made on the sludge, including sludge domestication, sludge inoculation and sludge culture, which is the same as specific embodiments disclosed in CN201410010263.0. After the sludge enters a leaching pool, a special leaching microbial nutrient can be added in an amount which is 5-10% of the absolute dry sludge, with an aeration cultivation for 24 hours and with a conditioning time for 36 hours.

After the sludge is conditioned by bioleaching, on the one hand, dewatering performance of the sludge can be improved and the specific resistance of the sludge can be reduced; and on the other hand, the leaching system is in a weak acid state, which can change the influence of heavy metal accumulation in the sludge and transfer the heavy metals in the sludge into a liquid phase, thereby detoxifying the heavy metals in the sludge.

The bioleaching conditioned concentrated sludge is pumped into a high-pressure diaphragm plate and frame with a high-pressure feed pump for a press filter dewatering with a pressure of the pump of 1.6-2.0 Mpa, and after the pressure chamber is filled up with the sludge, the press pump is switched for a secondary press dehydration with a pressure of 6.0-7.0 Mpa. The moisture content of the dewatered sludge can be directly reduced to 50% after the secondary high-pressure press dewatering.

The dewatered sludge is naturally air-dried with the moisture content of about 20% after air drying, crushed and sieved to control particle sizes of the dried sludge to be 5-10 mm.

The dried sludge is sent to a pyrolysis carbonization device at a temperature of 550-650, the temperature is kept constant during carbonization, the carbonization chamber is a closed space, and the carbonization process is in an oxygen-free or anoxic state.

The municipal sludge is made into the sludge-based biocoke after this treatment, and related parameters before and after treatment are shown in a table below.

| | | | |
|---|---|---|---|
| Water Content of Dewatered Cake Under Ultrahigh Pressure (%) | | 47.56% | |
| Moisture Content of Dried Sludge (%) | | 18.90% | |
| Carbonization Temperature (° C.) | | 700 | |
| Heavy metal content before and after leaching (mg/kg)(* data before and after leaching) | Cd | 2.97 | 1.83 |
| | Cu | 479 | 86.1 |
| | Zn | 1540 | 956 |
| | Ni | 81 | 35.4 |
| | Pb | 231 | 36.8 |

Case 2.

Details of residual sludge from a printing and dyeing sewage treatment plant are shown in a table below.

| | |
|---|---|
| Sludge Type | Printing and Dyeing Sludge |
| Sampling Point | After Concentration Tank + Centrifuge |
| Moisture Content | 83.75% |
| Organic Matters | 68.47% |

The sludge of the printing and dyeing sewage treatment plant is concentrated by a radial continuous gravity concentration, and the residual sludge of the secondary sedimentation tank is discharged into the concentration tank, and the sludge is gravity concentrated to a moisture content of about 96.5% without adding the concentration agent. After the sludge concentration, a dreg-water separation is made with a supernatant being discharged to the front influent end of the sewage treatment, and the concentrated sludge is pumped to the sludge conditioning unit by the lift pump.

A bioleaching conditioning process is made on the sludge, including sludge domestication, sludge inoculation and sludge culture, which is the same as specific embodiments disclosed in CN201410010263.0. After the sludge enters a leaching pool, a special leaching microbial nutrient can be added in an amount which is 10-15% of the absolute dry sludge, with an aeration cultivation for 24 hours and with a conditioning time for 48 hours.

The bioleaching conditioned concentrated sludge is pumped into a high-pressure diaphragm plate and frame with a high-pressure feed pump for a press filter dewatering with a pressure of the pump of 1.6-2.0 Mpa, and after the pressure chamber is filled up with the sludge, the press pump is switched for a secondary press dehydration with a pressure of 6.0-7.0 Mpa. The moisture content of the dewatered sludge can be directly reduced to 50% after the secondary high-pressure press dewatering.

The dewatered cake is delivered to the sludge dryer, which is of energy-saving and environment-friendly type, and the sludge is crushed to 5-10 mm by a grinder before entering the dryer, which is beneficial to heat absorbing and quick drying of the sludge. The sludge is uniformly dispersed in the dryer cavity through a belt conveyor, and heated exhaust gases are collected and waste heat is returned to the dryer for continuous utilization after a condensation and heat exchange.

The dried sludge is sent to the pyrolysis carbonization device and is rapidly heated to 500-600° C., the temperature is kept constant for 2-3 hours, and the carbonization process is in the oxygen-free or anoxic state. Then the sludge-based biocoke product is obtained after cooling to normal temperature.

The printing and dyeing sludge is made into the sludge-based biocoke after this treatment, and related parameters before and after treatment are shown in a table below.

| | | | |
|---|---|---|---|
| Water Content of Dewatered Cake Under Ultrahigh Pressure (%) | | 43.80% | |
| Moisture Content of Dried Sludge (%) | | 17.8% | |
| Carbonization Temperature (° C.) | | 650 | |
| Heavy metal content before and after leaching (mg/kg)(* data before and after leaching) | Cd | 24.6 | 2.56 |
| | Cu | 230 | 158 |
| | Zn | 610 | 302 |
| | Ni | 319.9 | 56.8 |
| | Pb | 40 | 26.9 |

The method for reducing the heavy metal content of the sludge-based biocoke is also suitable for wastewater and sludges involving biochemical treatment processes such as meat processing wastewater and sludges, food industry wastewater and sludges, wine industry wastewater and sludges, pharmaceutical wastewater and sludges, etc.

Using a sludge bioleaching conditioning process to produce the sludge-based biocoke can effectively remove accumulations of heavy metals in the sludge; with dual economic advantages of low investment and low operating cost, it opens up a market of resource utilization of the sludge, which has important economy, environmental protection and sociality.

In addition, it should be noted that the specific embodiments described in this specification may have different shapes, names or the like of parts and components; and the above contents described in this specification are only examples of the structure of the present disclosure. Equivalent or simple changes made in accordance with the configurations, features and principles described in the inventive concept are included in the scope of protection of the inventive disclosure. Various modifications, supplements or similar replacements can be made to the described specific embodiments by those skilled in the art to which the present disclosure pertains, which fall within the protection scope of the present disclosure without departing from the structure of the present disclosure or beyond the scope defined by the claims.

What is claimed is:

1. A method comprising following steps (1) to (5):

Step (1): concentrating a residual sludge produced by a sewage treatment plant;

Step (2): conditioning the concentrated sludge in a sludge bioleaching tank for 36-48 hours, with a pH value of the sludge being reduced to below 4.5;

Step (3): pumping the conditioned sludge into a high-pressure diaphragm plate and frame for a press filter dewatering to obtain a dewatered cake with a moisture content less than or equal to 50% w/w %;

Step (4): delivering the dewatered cake into a sludge dryer for crushing, heating and drying to obtain dried sludge with a moisture content of 15-22 w/w %; and Step (5): carbonizing the dried sludge into sludge-based biocoke at a high temperature in a pyrolytic carbonization device with a carbonization temperature of 500-650° C.;

wherein the step (2) further comprises the sludge bioleaching tank using a sludge bioleaching conditioning process, which comprises sludge acclimation, sludge inoculation and sludge cultivation steps;

wherein in the sludge bioleaching conditioning process for the concentrated residual sludge, a leaching microbial nutrient, comprising iron disulfide, glucose, and reduced iron, is added in an amount of 5-15 w/w % of the concentrated residual sludge.

2. The method according to claim 1, wherein in the step (1), a gravity concentration in a concentration tank is applied, and after the sludge concentration, a dreg-water separation is made with a supernatant being discharged to a front influent end of sewage treatment, and the concentrated sludge is pumped to the sludge bioleaching tank by a lift pump.

3. The method according to claim 1, wherein after the sludge is conditioned by bioleaching dewatering performance of the sludge is improved and a specific resistance of the sludge is reduced.

4. The method according to claim 1, wherein in the step (3), the conditioned concentrated sludge is pumped into the high-pressure diaphragm plate and frame with a high-pressure feed pump for the press filter dewatering with a pressure of the pump of 1.6-2.0 Mpa, and after a pressure chamber is filled up with the sludge, a press pump is switched for a secondary press dewatering with a pressure of 6.0-7.0 Mpa, and the moisture content of the dewatered sludge is directly reduced to below 50 w/w % after the secondary high-pressure press dewatering.

5. The method according to claim 1, wherein in the step (4), the sludge is dried by a dryer, and the sludge is crushed to 5-10 mm by a grinder before entering the dryer, thereby causing heat absorption and drying of the sludge; and the sludge is uniformly dispersed in the dryer cavity through a belt conveyor, and heated exhaust gases are collected and waste heat is returned to the dryer for continuous utilization after a condensation and heat exchange.

6. The method according to claim 3, wherein in the step (4), a pyrolysis carbonization temperature of the dried sludge is 500-650° C., the temperature is kept constant during carbonization, and a carbonization chamber is configured to be in an oxygen-free or anoxic state.

* * * * *